United States Patent [19]
Kishi

[11] Patent Number: 5,261,126
[45] Date of Patent: Nov. 16, 1993

[54] RAW SEWAGE DISPOSAL APPARATUS

[75] Inventor: Mitsuhiro Kishi, Tochigi, Japan

[73] Assignee: Japanic Corporation, Tochigi, Japan

[21] Appl. No.: 985,556

[22] Filed: Dec. 3, 1992

[51] Int. Cl.$^5$ .............................................. A47K 11/02
[52] U.S. Cl. ..................... 4/111.5; 4/111.4; 110/216
[58] Field of Search ................ 4/111.1, 111.2, 111.3, 4/111.4, 111.5, 111.6; 110/216, 204

[56] References Cited

U.S. PATENT DOCUMENTS

| | | | |
|---|---|---|---|
| 2,995,097 | 8/1961 | Kruckeberg et al. | 4/111.2 |
| 3,733,617 | 5/1973 | Bennett | 4/111.1 |
| 3,862,609 | 1/1975 | Eff | 110/216 |
| 4,999,930 | 3/1991 | Kishi et al. | |
| 5,022,330 | 6/1991 | Burgher et al. | 110/216 |
| 5,058,213 | 10/1991 | Kishi et al. | |
| 5,149,399 | 9/1992 | Kishi et al. | |
| 5,152,074 | 10/1992 | Kishi | |
| 5,199,362 | 4/1993 | Carter | 110/216 |

OTHER PUBLICATIONS

Drawings from copending U.S. Ser. No. 07/784 541, (12 sheets), U.S. Ser. No. 07/784 595 (33 sheets) and U.S. Ser. No. 07/809 962 (13 sheets).

*Primary Examiner*—Henry J. Recla
*Assistant Examiner*—Charles R. Eloshway
*Attorney, Agent, or Firm*—Flynn, Thiel, Boutell & Tanis

[57] ABSTRACT

A raw sewage disposal apparatus capable of evaporating the liquid component of raw sewage contained in an airtight vessel and capable of cleaning the vessel after and evaporating the liquid component of the raw sewage and heating the vessel so that dust which is not evaporated can be collected with assurance, hence the apparatus can be used for a long time. The apparatus comprises a vessel for containing the raw sewage therein, a heater for heating the lower portion of the vessel, an air supply pipe for supplying air into the vessel, a discharge pipe communicating with the vessel for discharging vapor formed by the evaporation of the liquid component for the raw sewage, a catalyst box connected to the discharge pipe by way of a closing valve, a dust collection box connected to the discharge pipe by way of a closing valve and a collection bag housed in the dust collection box for separating the dust from the air and collecting the dust.

19 Claims, 11 Drawing Sheets

RAW SEWAGE DISPOSAL APPARATUS

FIELD OF THE INVENTION

The present invention relates to a sewage disposal apparatus. The raw sewage disposal apparatus can be utilized in the outdoors, in a transportation vehicle such as a vessel or train, or in a tunnel through which a tank truck used for collecting raw sewage (hereinafter referred to as a vacuum truck) cannot go, and more particularly to such an apparatus which is capable of safely collecting dust and residual substances of the raw sewage which are formed by evaporating and drying the raw sewage in the vessel and which can be used for a long time.

BACKGROUND OF THE INVENTION

Description of the Prior Art

The raw sewage discharged from human bodies is typically discharged into a sewage system by use of a flush toilet or the like and then is flowed into a river after being temporarily contained in a holding tank and purified therein. However, at events such as festivals, athletic events, fairs, meetings and the like, temporary toilet facilities must be provided to dispose of raw human waste.

Employed conventionally are movable temporary toilets, most of which have a tank for temporarily storing the raw sewage therein. However, the temporary toilets have the problem that the raw sewage contained in the tank must be sucked into the vacuum truck for collection, which is laborious and time consuming and is unhygienic.

Transportation vehicles, such as buses, trains, vessels, etc., which operate over long distance are provided with a tank exclusively used for storing and holding the discharged raw sewage. The raw sewage in this tank is subjected to a deodorizing treatment by chemicals and thereafter is collected by the vacuum truck.

As mentioned above, the raw sewage in conventional temporary toilets or movable transportation facilities is contained as it is discharged from the human body and is collected thereafter. Accordingly, the storing method, the collection method and the disposal method are not modern and are very unhygienic.

In an attempt to ameliorate the above problems, there have been proposed several hygienic disposal methods. In one method, for example, chemicals are introduced into the tank where the raw sewage is contained to thereby prevent the bad smell and to effect sterilization of the sewage. This method, however, cannot be used for a long period of time because the chemicals become diluted and costs are high.

In another method, the raw sewage is contained in a bag made of vinyl and the like to prevent the diffusion of the bad smell. This method, however, requires a vinyl bag of large size and involves a high cost for disposal thereof, and it is troublesome to separate the raw sewage from the bag.

In still another method, the discharged raw sewage is directly dried by use of heat from a burner, etc. Since the primary component of raw sewage is liquid, a large amount of heat energy is required to remove the liquid and it takes a long time to effect disposal of the raw sewage.

In view of the drawbacks of the conventional methods of disposing of the raw sewage, the present inventor proposed a disposing apparatus having a casing provided with stirring blades and heat holding bodies therein in which the raw sewage is stirred by the rotation of the stirring blades and heated by heat generated by the heat holding bodies whereby the raw sewage is dried in a short period of time as disclosed in Japanese Patent Laid-Open Publication Nos. 63-124150, 63-172852, 63-190857, 63-292789 and Application No. 63-198858, corresponding U.S. Ser. No. 315 028, now U.S. Pat. No. 4 999 930, and its divisional application Ser. No. 609 378, filed Nov. 5, 1990. According to the proposed disposal methods, the raw sewage is heated, vaporized in a casing and the liquid component of the raw sewage is vaporized and diffused into the ambient atmosphere. Before the liquid component is diffused, the components which cause a bad smell are resolved by a catalyst so that the vapor is diffused into the atmosphere as an odorless vapor. It was preferably to employ such a method in view of environmental hygiene and preservation even if such method is employed in crowded buildings and/or by throngs of people.

Other related U.S. applications are Ser. No. 575 910, filed Aug. 29, 1990, Ser. No. 784 541 filed Nov. 18, 1991, Ser. No. 784 595 filed Nov. 18, 1991 and Ser. No. 809 962 filed Dec. 18, 1991

It is very hygienic to evaporate and dry the raw sewage contained in the airtight tank and such operations can be carried out systematically, which results in not causing a burden to the operators. However, according to the raw sewage disposal apparatus proposed by the inventor, an airtight vessel (drying cauldron) which accommodates the raw sewage therein is heated at the lower portion thereof by a heater, etc. so that the liquid component of the raw sewage is evaporated. Since the liquid component of the raw sewage is evaporated and the raw sewage is dried, bad smell is not dispersed outside the apparatus, which contributes to the hygienic disposal of the raw sewage. The bad smell component among the evaporated liquid component is oxidized by being forced to contact a catalyst so that the evaporated liquid component can be discharged to the atmosphere with an odorless state. As evident from this, the present invention is to provide a hygienic disposal structure different from the conventional privy type temporary toilet.

However, there remains several percent of fibrous substances, ash, etc. among the discharged raw sewage which cannot be evaporated. If the liquid component of the raw sewage is evaporated and the raw sewage is dried in the airtight vessel, the fibrous substance and ash, etc. remain and accumulate in the vessel. It was necessary to remove and clean the residual substances and dust in the vessel for continuous use of the raw sewage disposal apparatus for a long time. Accordingly, the conventional raw sewage disposal apparatus is equipped with a cleaning operation mechanism for collecting the dust. The cleaning operation mechanism evaporates the liquid component of the raw sewage and dries the raw sewage in the vessel and subjects them to the cleaning operation so as to always keep the inside of the vessel clean. If the raw sewage is not subjected to the cleaning operation, the dust and dregs accumulate in the vessel, which impedes the drying operation of the raw sewage.

In the cleaning operation of the vessel for evaporating the liquid component of the raw sewage and drying the raw sewage, a compressed air is jetted from a part of the vessel so that the dust formed by the residual substances which is formed by the evaporation of the liquid component is blown up and discharged together with air outside the vessel. The discharged dust is separated from air using a cyclone dust collector. In the cyclone dust collector, the discharged air is circled in a vortex at high speed whereby the heavy dust which is circled with air drops and is separated from the air. The dust separated from the air by the cyclone dust collector is collected by a dust collection box while air alone is forced to contact the catalyst and is diffused outside the raw sewage disposal apparatus. Although the cyclone dust collector has a simple structure, it should be precisely manufactured since air should be circled in a vortex. Even if the dust can be separated from air by permitting air to circle at high speed, the fine dust is not always separated from the air and is liable to diffuse outside the raw sewage disposal apparatus. Under the circumstances, there is a desire to develop a mechanism for separating the dust from the air.

To achieve the above object, the raw sewage disposal apparatus according the present invention, in a preferred embodiment, comprises a heat-resistant vessel for containing raw sewage therein, a heating means provided under the vessel for heating the vessel to thereby evaporate the liquid component of the raw sewage and dry the raw sewage in the vessel, a stirring means having a plurality of stirring blades for stirring the raw sewage in the vessel, a plurality of spherical heat-holding bodies contained in the vessel, an introduction pipe communicating with the side surface of the vessel, a stool connected to the upper end of the introduction pipe, a gear box mounted on the vessel and having a rotary shaft which stirs the raw sewage, a heating pipe which has a heater therein and communicates with a first air supply means at one open end thereof and with a catalyst box at the other open end thereof, a second air supply means communicating with the vessel which supplies fresh air into the vessel, the catalyst box containing catalyst and filter therein and communicating with the second air supply means by way of an exhaust pipe and an ejector, an air introduction pipe communicating with the side surface of the heating pipe at one open end thereof, the air introduction pipe being branched into two pipes at the upper open end thereof, a discharge pipe communicating with the vessel at one open end thereof for exhausting vapor formed by the evaporation of the liquid component of the raw sewage in the vessel, the discharge pipe communicating with the one branched pipe of the air introduction pipe at the side surface thereof by way of a first closing valve, a cleaning pipe communicating with the other end of the discharge pipe by way of a second closing valve, a dust collector connected to the cleaning pipe, a return pipe communicating with the dust collector at one open end thereof and communicating with the other branched pipe of the air introduction pipe by way of a third closing valve.

According to the present invention, the raw sewage discharged in the stool passes the shutter mechanism and drops into the introduction pipe and is contained in the vessel (i.e., the drying cauldron). Since the drying cauldron is heated by the heater, etc. from the outside thereof, the liquid component, which is a main component of the raw sewage contained therein, is evaporated as vapor. The vapor flows toward the catalyst box by way of the discharge pipe. Hot air is always supplied to the catalyst box from a heating pipe so that the catalyst in the catalyst box is always heated. At this state, if the vapor formed by the evaporation of the liquid component flows into the catalyst box and contacts the catalyst, a bad smell component contained in the vapor is subjected to oxidation and reduction and is thereby made odorless. Accordingly, the bad smell cannot be diffused outside the raw sewage disposal apparatus.

After the drying operation is performed for a given time, the closing valve in the discharge pipe is closed and at the same time the closing valve in the dust collector is opened so that the drying cauldron communicates with the dust collection box. Thereafter, compressed air is jetted to the drying cauldron to thereby blow up the dust after the liquid component is evaporated and successively the dust is permitted to flow into the dust collection box together with the air from the discharge pipe. Since the collection bag made of cloth or paper is housed in the dust collection box, the residual substances are caught by this collection bag so that pure air alone is diffused outside the raw sewage disposal apparatus. The collection bag can catch even fine dust. If a given amount of dust is contained in the collection bag, the collection bag containing dust therein can be disposed of. With such an arrangement, the structure of the raw sewage disposal apparatus is simplified because of non-employment of the cyclone dust collector to thereby catch even the fine dust so that environmental pollution can be prevented.

SUMMARY OF THE INVENTION

It is therefore an object of the present invention to provide a raw sewage disposal apparatus capable of meeting the demand for improvements in the conventional raw sewage disposal apparatus and proposed raw sewage apparatus.

To achieve the object of the present invention, the raw sewage disposal apparatus, according to the first aspect of the present invention, comprises a heat-resistant vessel for containing raw sewage therein, a heating means for heating the vessel and drying raw sewage, a stirring means having a plurality of stirring blades for stirring the raw sewage in the vessel, a plurality of spherical heat-holding bodies contained in the vessel, an introduction pipe connected to the side surface of the vessel, and a stool connected to the upper end of the introduction pipe, wherein the vessel is heated by the heating means so that the liquid component of the raw sewage is evaporated and disposed of, characterized further by an air supply pipe for supplying air into the vessel, a discharge pipe communicating with the vessel for discharging the evaporated liquid component, a catalyst box connected to the discharge pipe through a closing valve, a dust collection box connected to the discharge pipe through the closing valve and a collection bag housed in the dust collection box for collecting dust from air.

DETAILED DESCRIPTION

Figure 1:
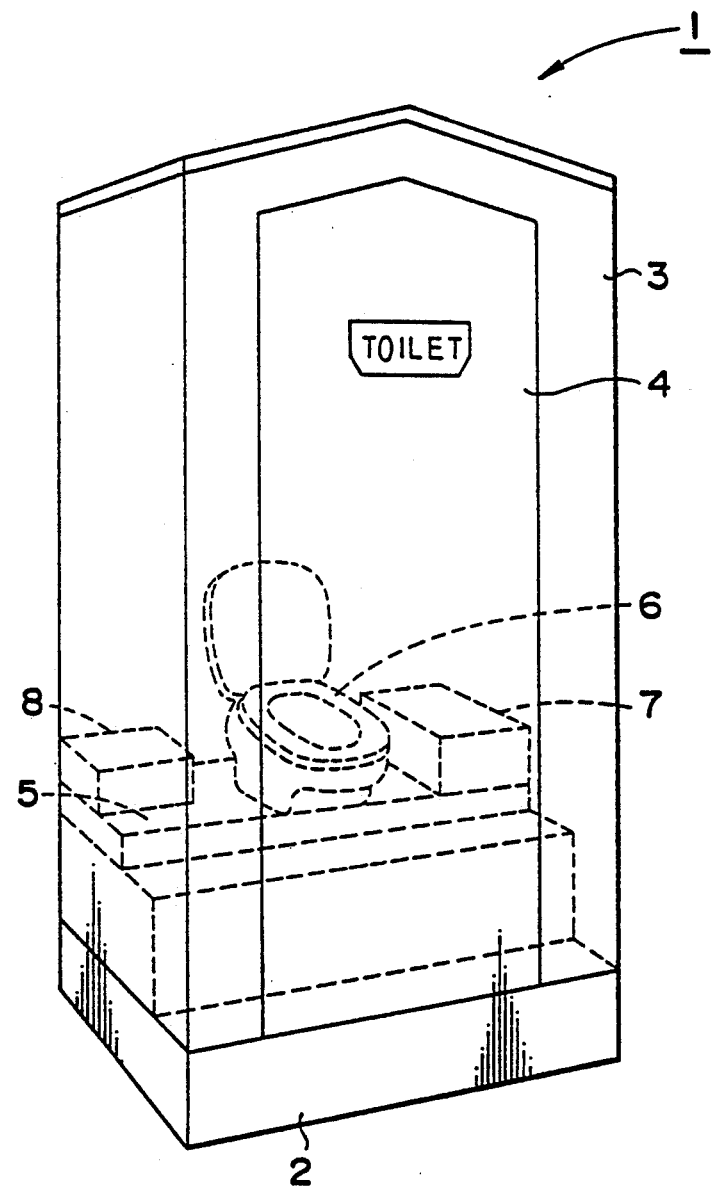
FIG. 1 is a perspective view of a raw sewage disposal apparatus employed in a temporary toilet according to a first embodiment of the present invention.

First Embodiment (FIGS. 1 to 10):

A raw sewage disposal apparatus, according to a first embodiment of the present invention, will be described with reference to FIGS. 1 to 10. Described in the first embodiment is a portable or temporary toilet 1, incorporating a raw sewage disposal apparatus, movable by a truck or the like. In FIG. 1, the temporary toilet 1 is made of plastic or reinforced synthetic resin and has a box-like shape. The toilet 1 has a base 2 which can be supported on the ground and which has a roofed house 3 fixed thereto. A door 4 is attached to a front portion of the house 3. The temporary toilet 1 has inside thereof a raw sewage disposal apparatus 5 which is fixed to an upper portion of the base 2. A stool 6 is fixed to an upper portion of the disposal apparatus 5 for receiving the raw sewage. The base 2 has a cover 7 which is fixed at a right side thereof for housing a motor therein and a cover 8 which is fixed at a left side thereof for housing a catalyst therein. The raw sewage disposal apparatus is assembled as a unit which is capable of operating by itself and generally comprises a drying mechanism, a blowing mechanism, a collection mechanism and a cleaning mechanism.

Figure 2:
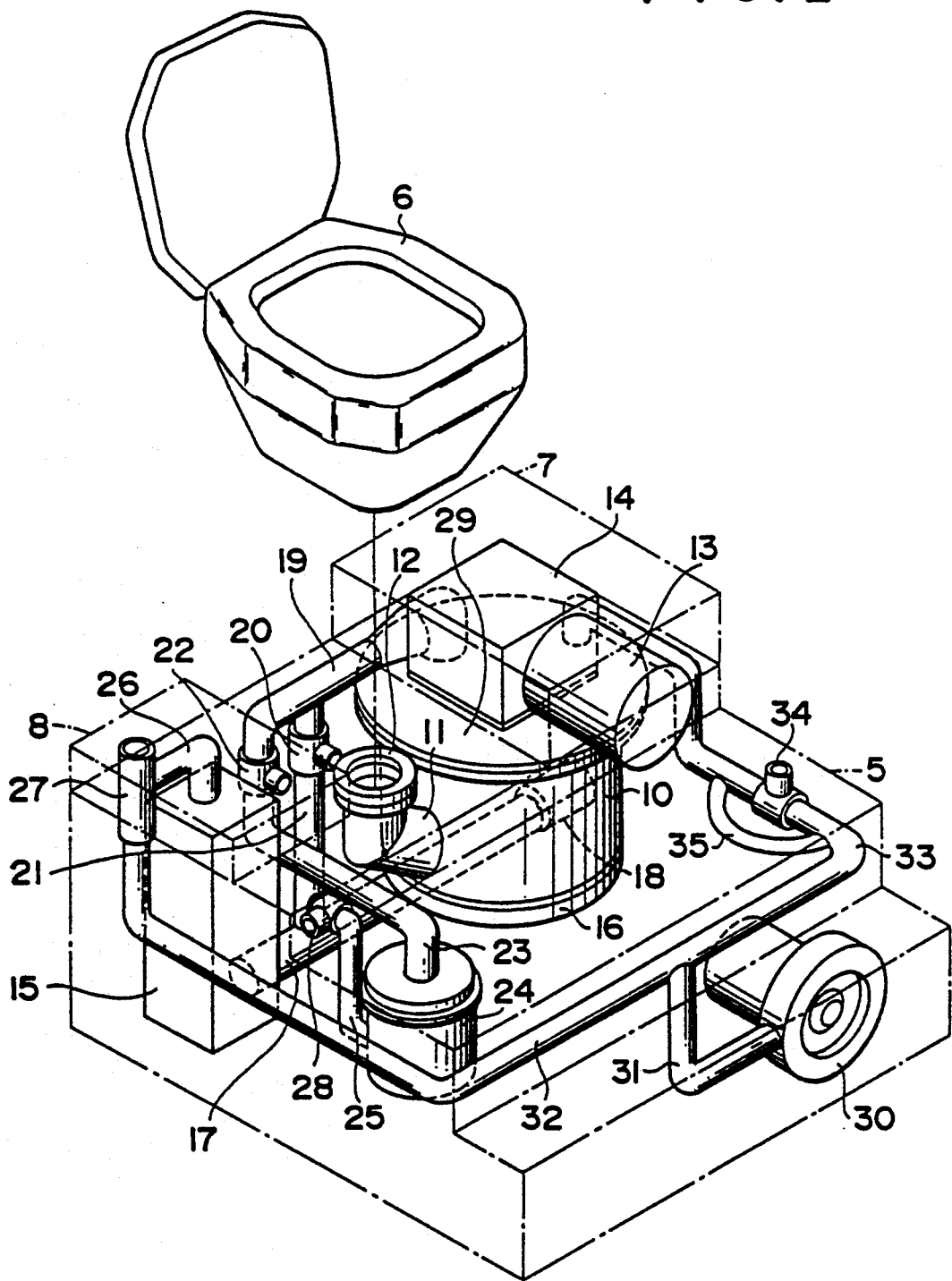
FIG. 2 is a cross-sectional view showing the internal structure of the raw sewage disposal apparatus of FIG. 1.

The raw sewage disposal apparatus 5 comprises, as shown in FIG. 2, a cylindrical drying vessel or cauldron 10 fixed to the right innermost portion thereof and an introduction pipe 11 connected to the central side portion of the drying cauldron 10, which pipe is inclined with respect to the vertical toward the upper portion thereof. The upper portion of the introduction pipe 11 extends to the lower opening of the stool 6. A shutter valve 12 is interposed between the upper end of the introduction pipe 11 and the stool 6. A gear box 14 is mounted on the drying cauldron 10 and has a rotary shaft 38 which stirs the raw sewage contained in the drying cauldron 10. A motor 13 is connected to the side surface of the gear box 14, which reduces the turning effort of the motor 13 and changes the direction of the turning effort by a gear in the gear box 14. Both the gear box 14 and the motor 13 are covered by the cover 7 at the upper portion thereof. A rectangular catalyst box 15 is vertically provided at the innermost left side of the raw sewage disposal apparatus 5. A substantially L-shaped exhaust pipe 26 is provided on and is connected at one end thereof to the upper portion of the catalyst box 15 and is connected at the tip end thereof to the central side surface of an ejector 27.

A long cylindrical heating pipe 17 is provided at the innermost portion of the raw sewage disposal apparatus 5 and communicates at the tip end thereof with the lower side surface of the catalyst box 15. The heating pipe 17 supplies hot air into the catalyst box 15 to thereby heat the catalyst in the catalyst box 15. An air blower 18 is connected to an opening at the other end of the heating pipe 17. A circular cover plate 29 is brought into contact with the upper surface of the drying cauldron 10 so as to close the drying cauldron 10. A discharge pipe 19 is fixed to the cover plate 29 and communicates with the inside of the drying cauldron 10. The discharge pipe 19 is connected to the upper end of an air introduction pipe 21 by way of a closing valve 20. The air introduction pipe 21 at the lower end thereof communicates with the side surface of the heating pipe 17. A cleaning pipe 23 is connected to the tip end of the discharge pipe 19 by way of a closing valve 22 and communicates at the tip end thereof with the upper portion of a dust collector 24. A return pipe 25 communicates with the lower side surface of the dust collector 24 and also communicates with the side surface of the air introduction pipe 21 by way of a closing valve 28.

There is provided an air blower 30, which can be driven by a motor, at the front surface of the raw sewage disposal apparatus 5. An air blower pipe 31 connected to the air blower 30 branches into left and right sides to form a pressure application pipe 32 and an air supply pipe 33. The pressure application pipe 32 is connected at the tip end thereof to the lower opening of the ejector 27 for always supplying air into the ejector 27. The air supply pipe 33 is connected at the tip end thereof to the cover plate 29 and communicates with the inside of the drying cauldron 10 by way of a closing valve 34. A throttle pipe 35 having a small diameter is connected to the air supply pipe 33 to thereby skip over the closing valve 34 so as to form a bypass pipe.

Figure 3:
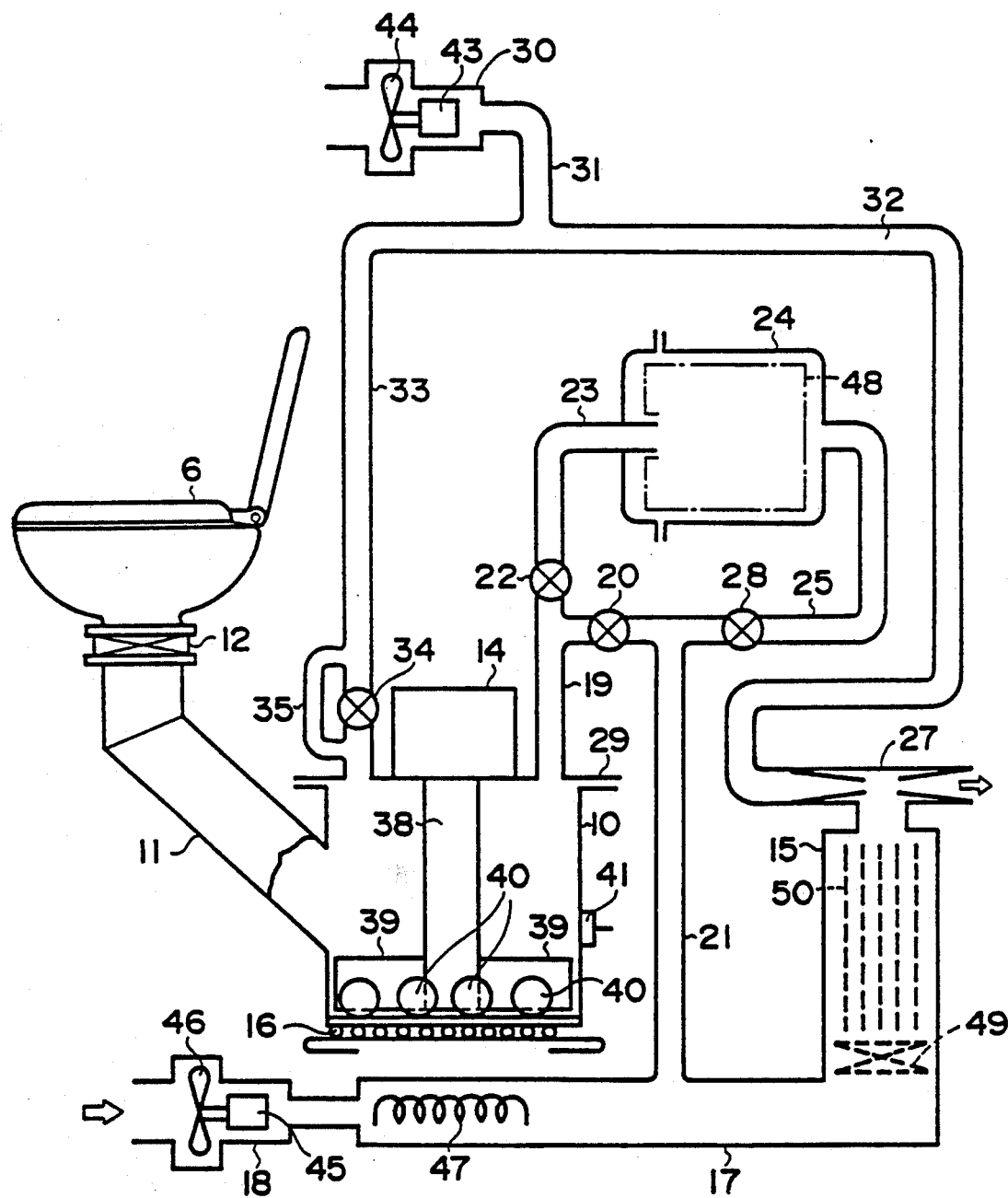
FIG. 3 is a view showing a piping system for connecting the components of the raw sewage disposal apparatus of FIG. 1.

FIG. 3 shows the piping system between the drying cauldron 10, the catalyst box 15, the dust collector 24, the stool 6, etc.

The stool 6 is connected to the shutter 12 which is connected to an open end of the introduction pipe 11. The introduction pipe 11 is inclined aslant relative to the drying cauldron 10 and is connected at the tip end thereof to the central side surface of the drying cauldron 10.

The drying cauldron 10 for heating the discharged raw sewage and evaporating the liquid component thereof is cylindrical and hollow and has a bottom wall at the lower end thereof. A heater 16 is wound around the bottom of the drying cauldron 10 and the lower side periphery thereof. The circular cover plate 29 is brought into contact with the upper opening of the drying cauldron 10 to thereby define a closed space or compartment within the drying cauldron 10. The gear box 14 is fixed to the upper surface of the cover plate 29. The rotary shaft 38 extends from the bottom surface of the gear box 14 into the drying cauldron toward the bottom portion thereof and has a lower end provided with a plurality of stirring blades 39 protruding therefrom. Contained inside the drying cauldron 10 are a plurality of spherical heat-holding bodies 40 so as to be moved about by rotation of the stirring blades 39. The heat-holding bodies 40 are formed of a high heat-holding material, preferably a metal such as $Al_2O_3$. A temperature sensor 41, which measures the temperature of the drying cauldron 10, is brought into contact with the side surface of the drying cauldron 10.

The discharge pipe 19 is connected to the cover plate 29 and communicates with the inside of the drying cauldron 10. The discharge pipe 19 is branched into two pipe parts to which the closing valves 20 and 22 are respectively connected. The air introduction pipe 21 communicates with the closing valve 20 and also communicates at the lower end thereof with the side surface of the heating pipe 17. The cleaning pipe 23 is connected to the closing valve 22 and at the tip end thereof extends to the inside of the dust collector 24. The dust collector 24 has inside thereof a collection bag 48 which is for example formed of a cloth or a course paper and is like a bag. The collection bag 48 has an opening which is connected to the tip end of the cleaning pipe 23. The return pipe 25 is connected to the dust collector 24 at the side opposite to the cleaning pipe 23 and communicates with an outer periphery of the collection bag 48. The return pipe 25 communicates with the air introduction pipe 21 by way of a closing valve 28. A fan 44, which is driven by a motor 43, is housed in the air blower 30. The air which is supplied under pressure by the air blower 30 is supplied to the air blower pipe 31. The air blower pipe 31 is branched into the pressure application pipe 32 and the air supply pipe 33, and the pressure application pipe 32 is connected to the lower end of the ejector 27. When the air supplied from the air blower 30 passes the ejector 27, negative pressure is generated in the ejector 27 due to air flow. The air supply pipe 33 is connected at the tip end thereof to the cover plate 29 by way of the closing valve 34 and communicates with the inside space of the drying cauldron 10. The throttle pipe 35 is provided midway of the air supply pipe 33 so as to bypass the closing valve 34, whereby the air necessary for oxidation is supplied into the drying cauldron 10 by way of the air supply pipe 33 and the throttle pipe 35 even if the closing valve 34 is closed.

The air blower 18 houses therein a fan 46 which is driven by a motor 45 and is connected to the heating pipe 17 at the output side thereof. A heater 47 is housed in the heating pipe 17 and the air supplied from the air blower 18 is heated by the heater 47. The heating pipe 17 at the tip end thereof communicates with the lower side surfaces of the catalyst box 15. The catalyst box 15 houses therein a filter 49 at the lower portion thereof and a catalyst 50 at the upper portion thereof. Accordingly, the air heated by the heater 47 passes the filter 49 and heats the catalyst 50 and is successively drawn by the negative pressure generated in the ejector 27 and is finally diffused outside the sewage disposal apparatus.

Figure 4:
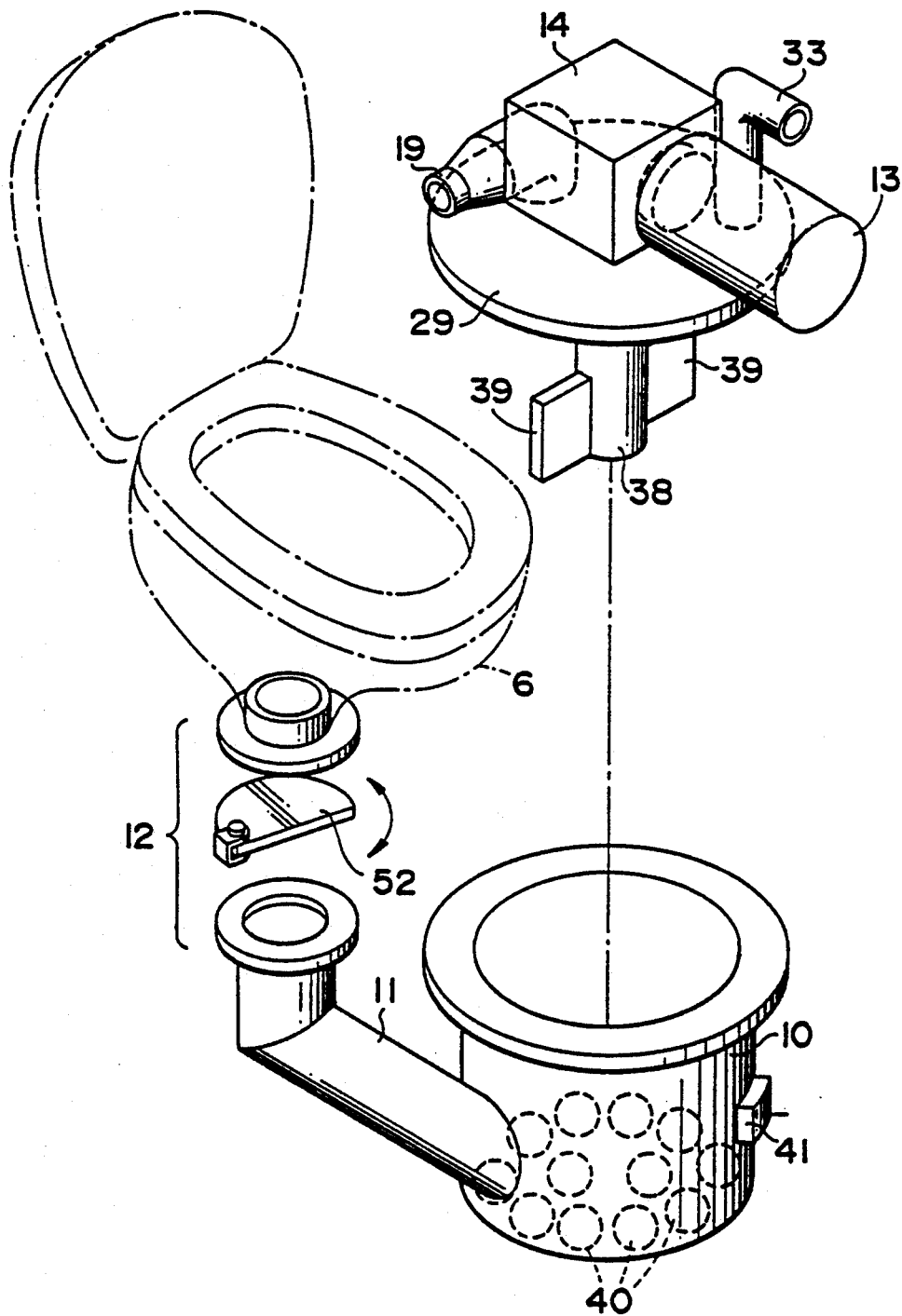
FIG. 4 is an exploded perspective view showing a drying cauldron and a stool.

FIG. 4 is an exploded perspective view showing the relation between the stool 6, the drying cauldron 10, the cover plate 29, etc.

In FIG. 4, a shutter plate or valve 52 which is closable in a horizontal direction is supported inside the shutter 12. The horizontal motion of the shutter plate 52 allows or prevents communication of the stool 6 with the introduction pipe 11.

Figure 5:
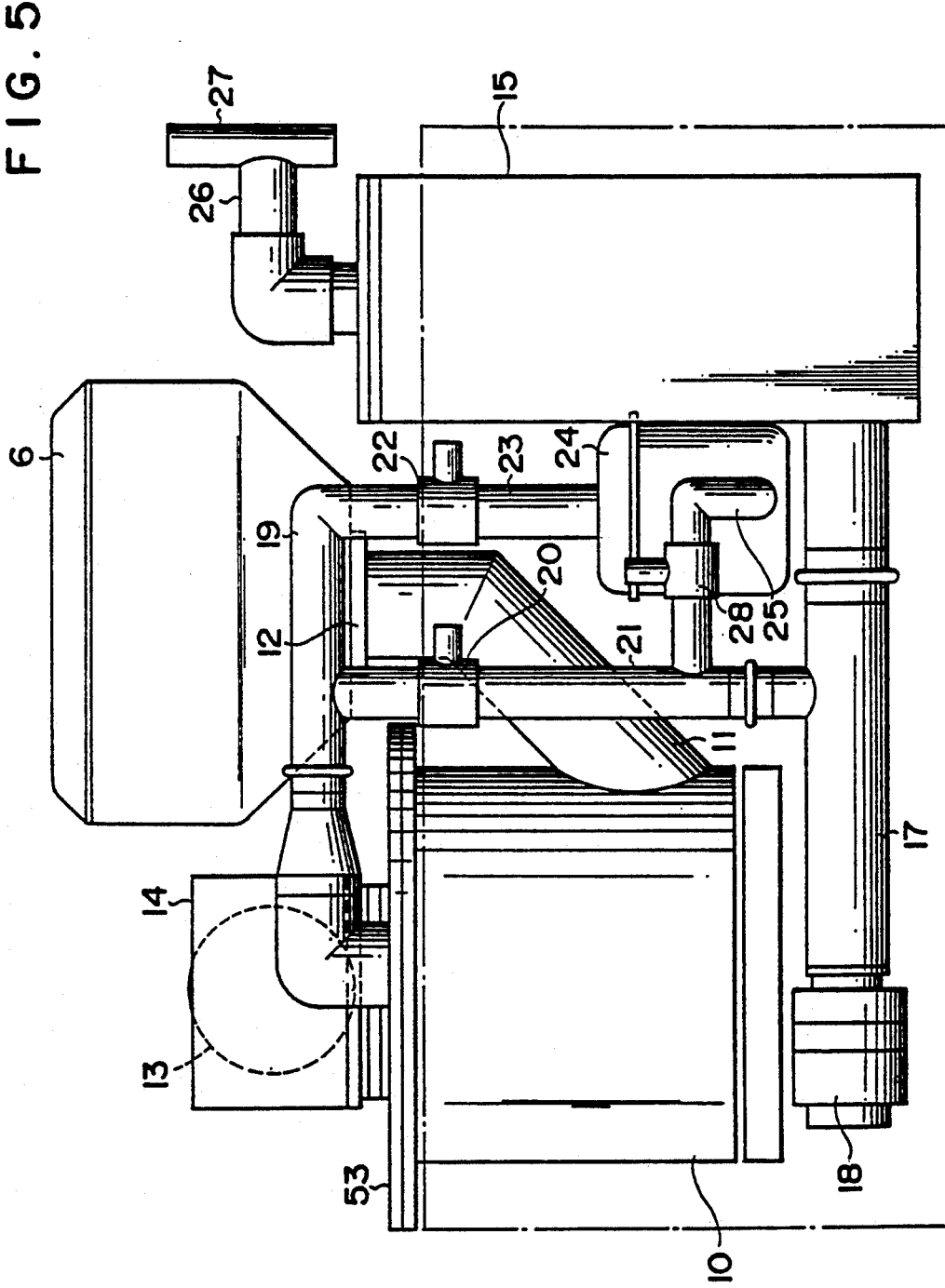
FIG. 5 is a rear view of the raw sewage disposal apparatus of FIG. 1.

FIG. 5 is a rear view showing the piping system for connecting the components of the raw sewage disposal apparatus 5. In the same figure, the arrangement of the raw sewage disposal apparatus 5 is viewed from the left upper portion in FIG. 2.

Figure 6:
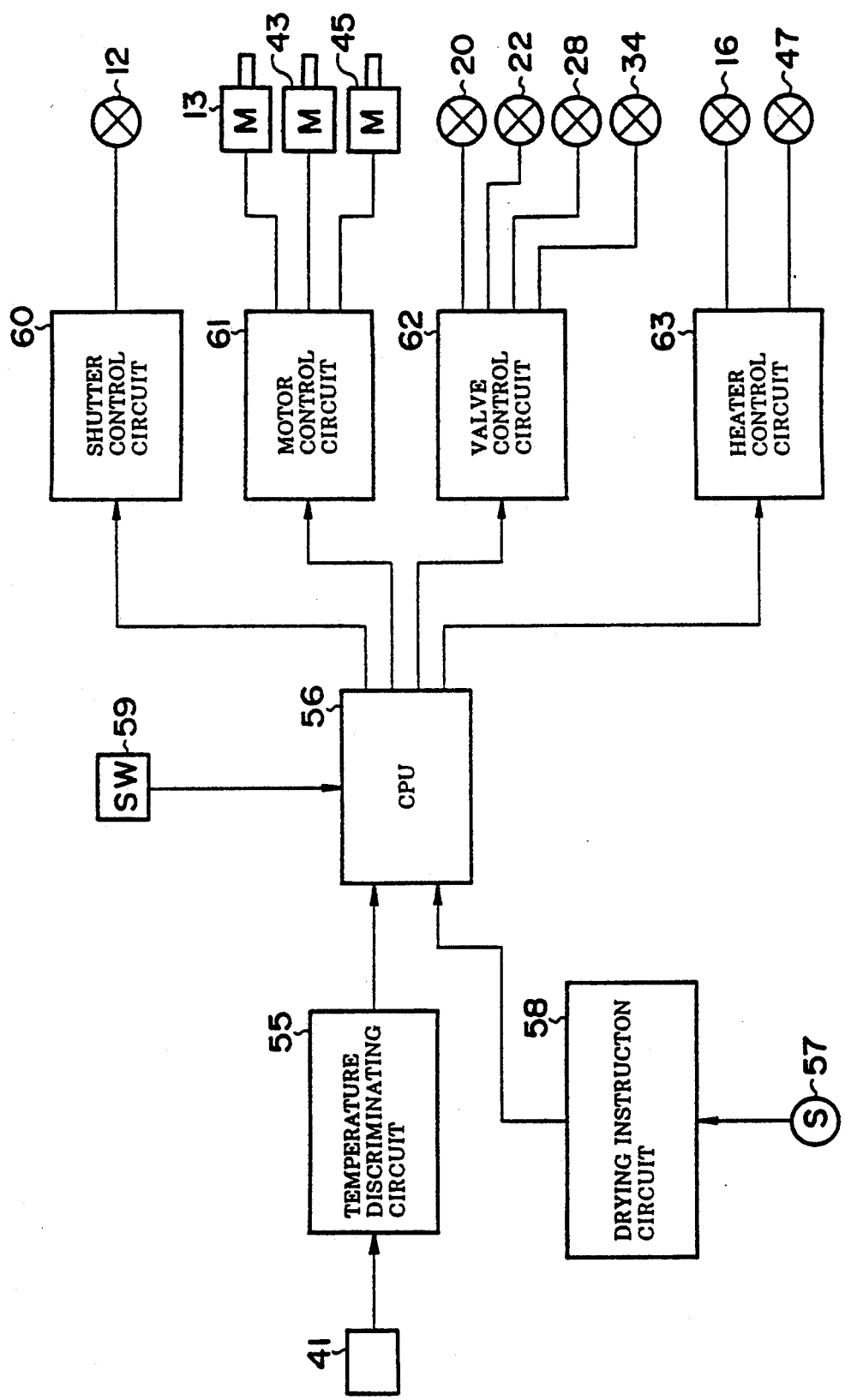
FIG. 6 is a block diagram showing a control system of the raw sewage disposal apparatus of FIG. 1.
Figure 7:
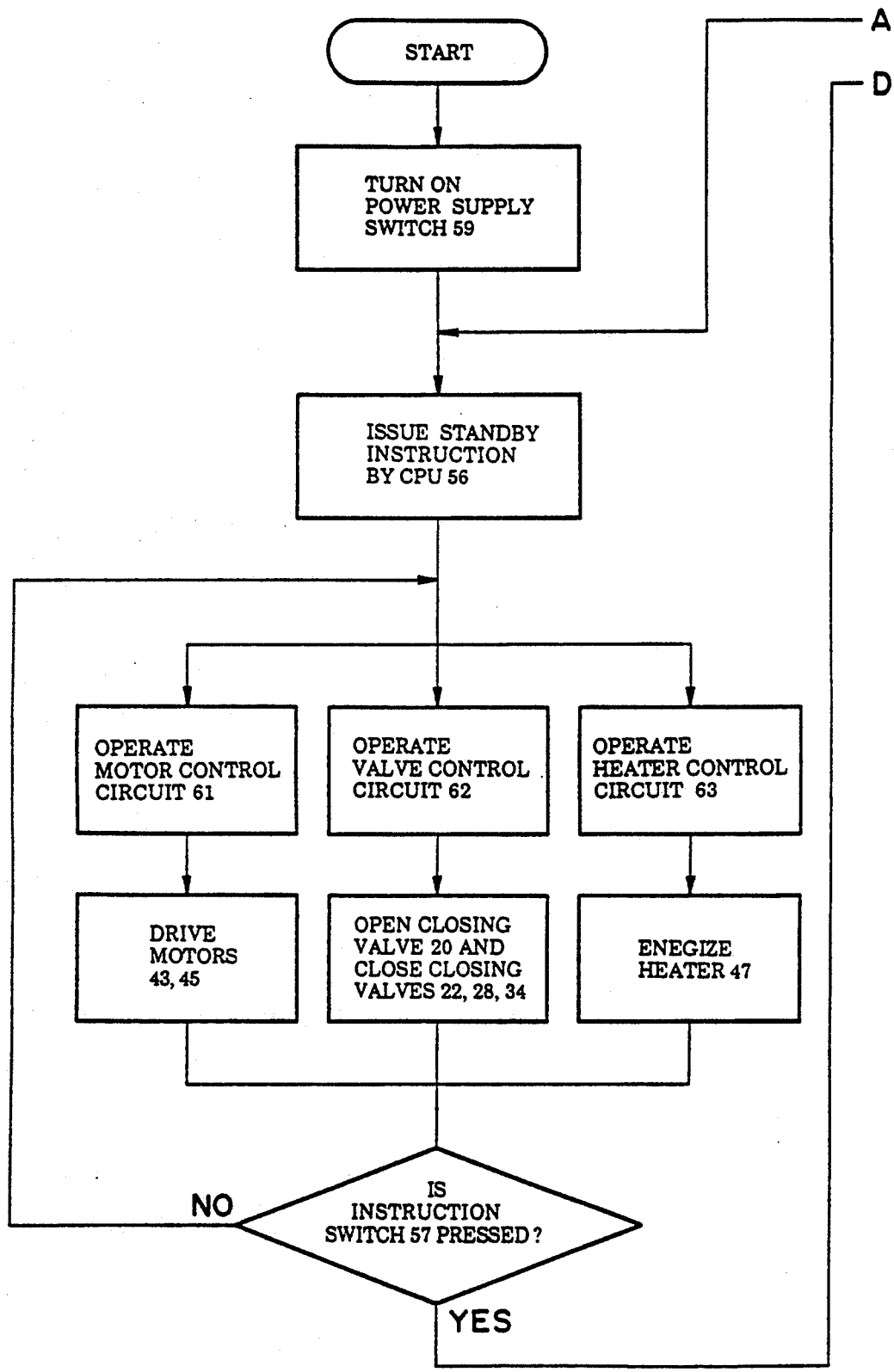
FIGS. 7 to 10 are flow charts showing operations of the raw sewage disposal apparatus of FIG. 1.
Figure 8:
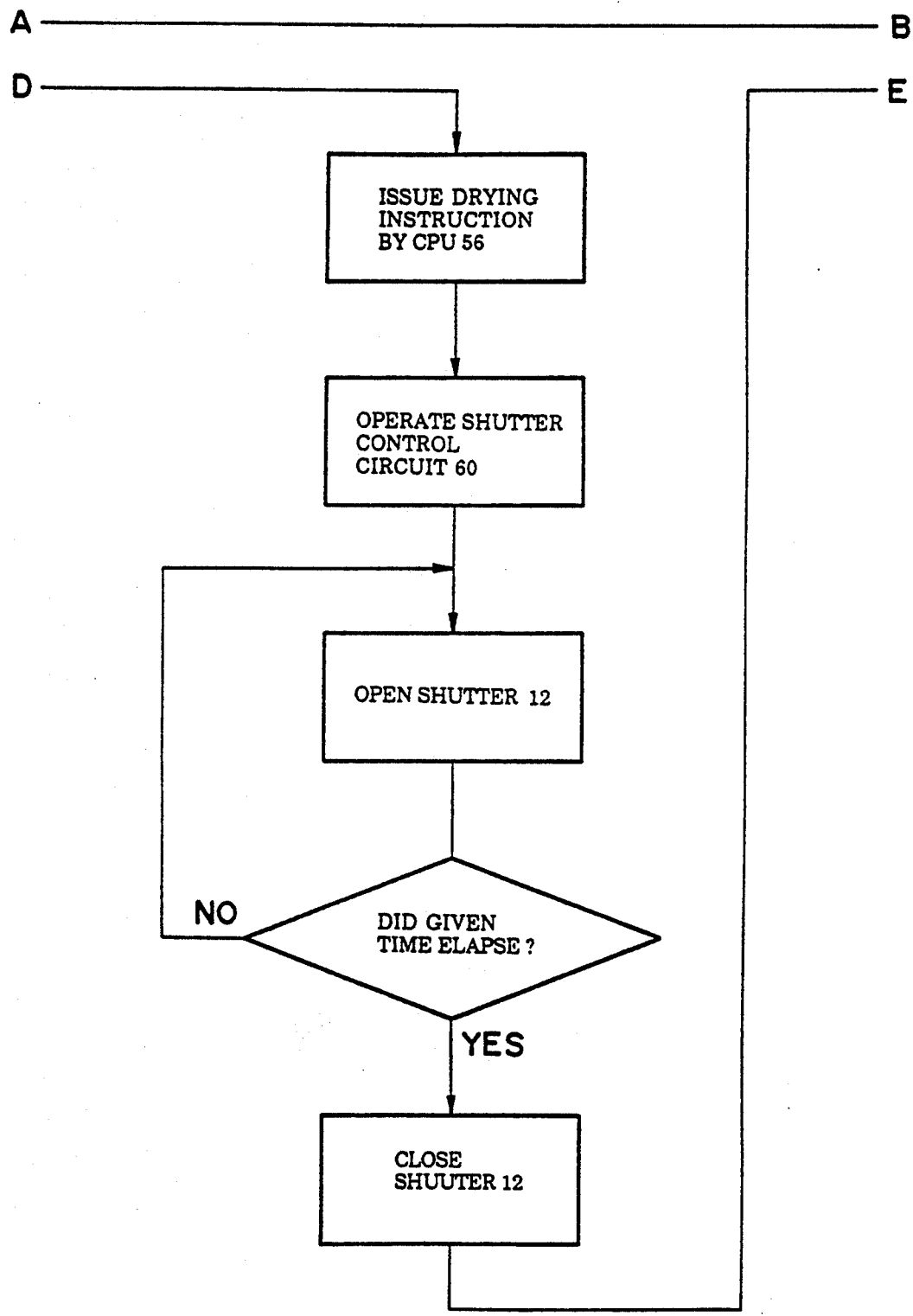
Figure 9:
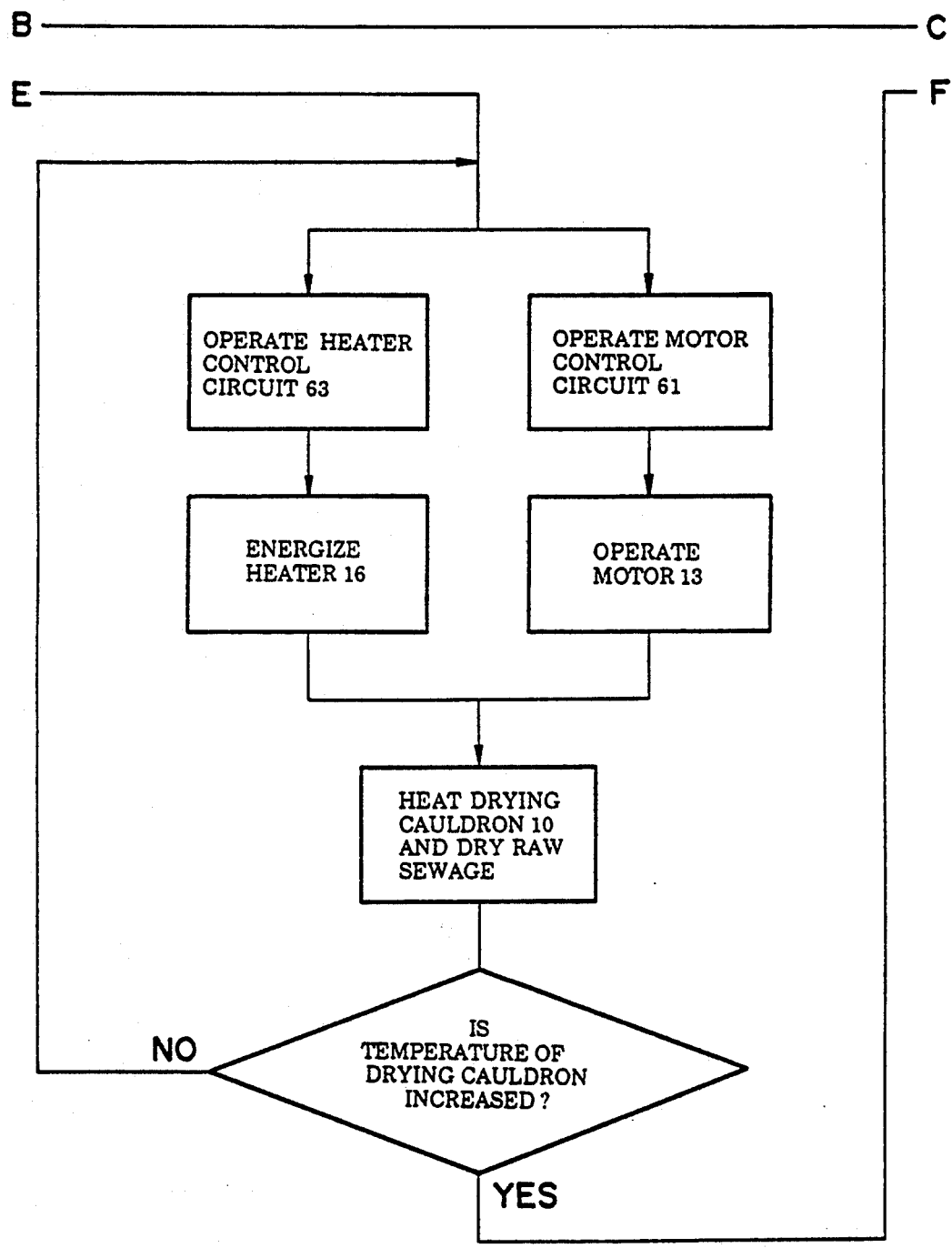
Figure 10:
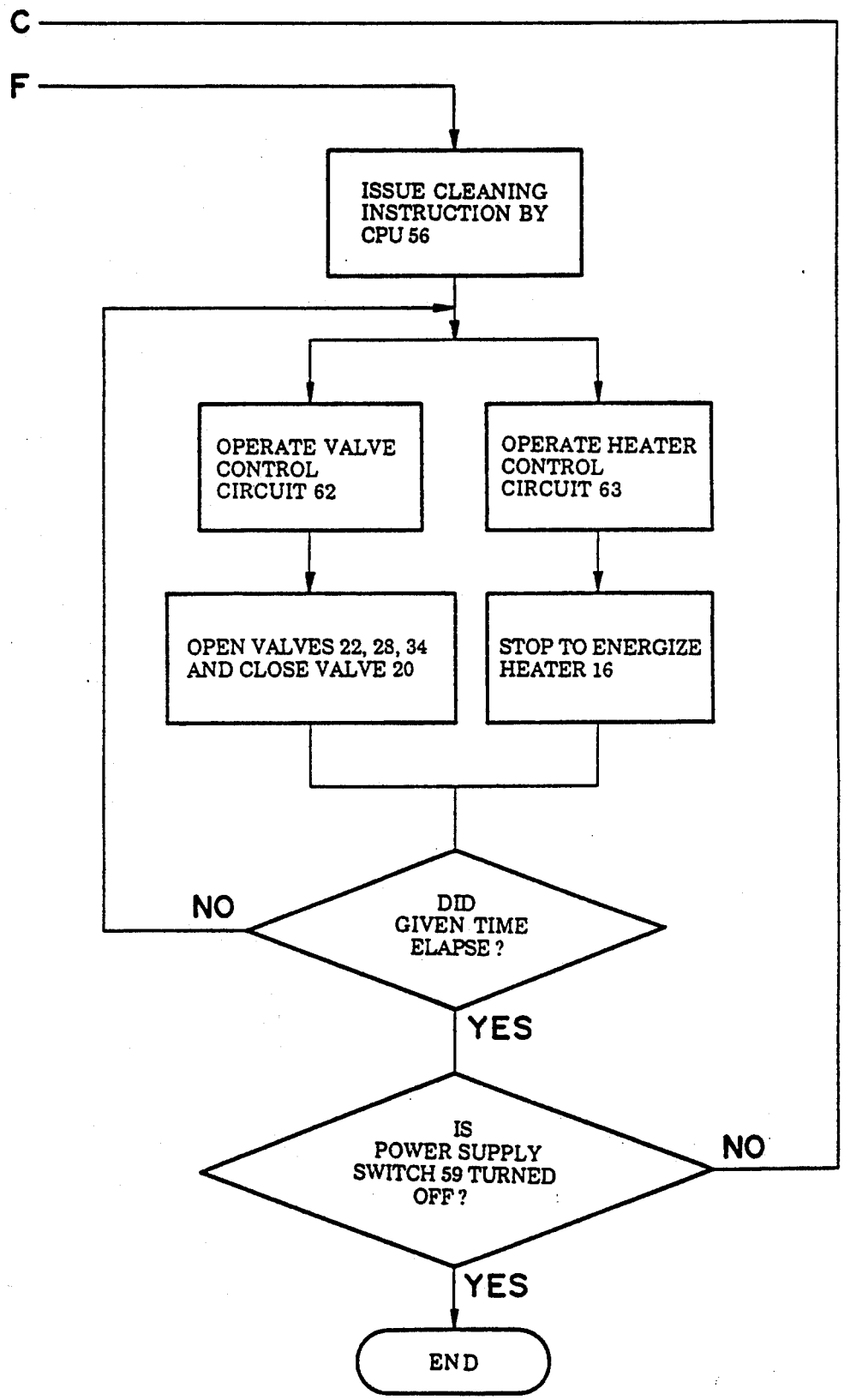

FIG. 6 is a block diagram showing a control system of the raw sewage disposal apparatus 5.

An output of the temperature sensor 41 is connected to a temperature discrimination circuit 55, the output of which is connected to a CPU 56 comprising a microcomputer, etc. An output of an instruction switch 57, which is used for representing the completion of the use of the stool 6, is connected to a drying instruction circuit 58, the output of which is also connected to the CPU 56. The CPU 56 is connected to a power supply switch 59, which starts all the components of the raw sewage disposal apparatus 5 as well as the CPU 56 and instructs the completion of the stool 6.

Control outputs, i.e. instruction signals issued by the CPU 56, are supplied to a shutter control circuit 60, a motor control circuit 61, a valve control circuit 62 and a heater control circuit 63. Each of the shutter control circuit 60, the motor control circuit 61, the valve control circuit 62 and the heater control circuit 63 is individually and independently operated upon reception of the instruction signals from the CPU 56 to thereby control each mechanism which is respectively connected to these circuits. The shutter 12 is connected to the output of the shutter control circuit 60 and motors 13, 43 and 45 are respectively connected to the motor control circuit 61. The closing valves 20, 22, 28 and 34 are independently connected to the valve control circuit 62 and the heaters 16 and 47 are connected to the heater control circuit 63.

The operation of the first embodiment will be described hereinafter.

Before disposing of the raw sewage by the raw sewage disposing apparatus 5, the raw sewage disposal apparatus should be placed in the standby condition.

At first, the power supply switch 59 is turned on so that the CPU 56 issues instruction signals to start the disposal operation by the raw sewage disposal apparatus 5. The instruction signals are supplied to the motor control circuit 61, the valve control circuit 62 and the heater control circuit 63.

The heater control circuit 63 energizes the heater 47 to heat the inside of the heating pipe 17. At the same time, the motor control circuit 61 drives the motors 43 and 45 whereby the air supplied under pressure by the fan 44, which is driven by the motor 43, is supplied to the ejector 27 by way of the air blower pipe 31 and the pressure application pipe 32. When the air supplied from the fan 44 flows into the ejector 27, a negative pressure is generated inside the ejector 27 so that the air inside the catalyst box 15 is drawn thereby. When the motor 45 is driven, the fan 46 is rotated to thereby draw the fresh air and supply the fresh air toward the heater 47. When the air supplied to the heater 47 contacts the heater 47, the air is heated and the heated air, i.e., hot air is supplied inside the catalyst box 15 through the heating pipe 17. Accordingly, air heated by the heater 47 always heats the catalyst 50. Thus, the catalyst 50 is always heated at a given temperature and is kept at the temperature for performing the oxidation and reduction.

There are formed two air routes through which the fresh air circles, namely, a first air route through which the fresh air circles in the air blower 30, the air blower pipe 31, the pressure application pipe 32 and the ejector 27, and a second air route through which the fresh air circles in the air blower 18, the heating pipe 17, the catalyst box 15 and the ejector 27. These two routes are always defined in the standby condition.

When the raw sewage disposal apparatus 5 is in the standby condition, the temporary toilet 1 can be used. When using the temporary toilet 1, the user opens the door 4 and enters the house 3 and discharge the raw sewage toward the stool 6. When the user pushes the instruction switch 57 after use of the stool 6, the disposing operation starts. First, when the instruction switch 57 is pressed down, a signal is issued. The signal is supplied to the drying instruction circuit 58 and is successively supplied to the CPU 56. The CPU 56 instructs the shutter control circuit 60 to open the shutter 12. Upon reception of the instruction signal from the shutter control circuit 60, the shutter plate 52 moves horizontally to thereby allow the stool 6 to communicate with the introduction pipe 11 whereby the raw sewage stored on the upper portion of the shutter 12 is forced to drop in the introduction pipe 11 and to flow inside the drying cauldron 10 After a given time elapses, the shutter control circuit 60 instructs the shutter 12 to close the shutter plate 52. The shutter 12 is interposed between the stool 6 and the introduction pipe 11 for preventing the base smell, which is caused at the time when the liquid component of the raw sewage is evaporated and the raw sewage is dried, from being discharged from the opening of the stool 6.

At the same time as the shutter control circuit 60 operates, the CPU 56 instructs the motor control circuit 61 to operate the motor 13. When the motor 13 is operated, the turning effort of the motor 13 is transmitted to the gear box 14 whereby the turning effort is reduced and the direction thereof is changed by a gear in the gear box 14 so that the rotary shaft 38 is rotated about its vertical axis. When the rotary shaft 38 is rotated, both the stirring blades 39 and the heat-holding bodies 40 are rotated in the bottom portion of the drying cauldron 10.

At the same time, the valve control circuit 62, upon reception of the instruction signal from the CPU 56, opens the closing valve 20 and closes the closing valves 22, 28 and 34. With the opening and closing of these valves, there is formed an air route through which the fresh air circles in the air blower 30, the air blower pipe 31, the air supply pipe 33 and the throttle pipe 35 whereby an appropriate amount of air is introduced into the drying cauldron 10. There is formed an air route through which the air circles in the discharge pipe 19, the closing valve 20, the air introduction pipe 21, the heating pipe 17 and the catalyst box 15 and is then drawn by the ejector 27. Furthermore, there is provided the first air route through which the fresh air always circles in the air blower 30, the air blower pipe 31, the pressure application pipe 32 and the ejector 27 and the negative pressure is generated in the ejector 27. Accordingly, the air is introduced into the drying cauldron 10 after passing the air route through which the fresh air is supplied from the air blower 30, the air blower pipe 31, the air supply pipe 33 and the throttle pipe 35. Furthermore, there is formed the air route through which the air in the drying cauldron 10 flows into heating pipe 17 by way of the discharge pipe 19, the closing valve 20 and the air introduction pipe 21. A small amount of air is supplied into the drying cauldron 10 by way of the throttle pipe 35 for facilitating the oxidation of the raw sewage by contacting the air when the raw sewage is heated.

Simultaneously with the operations set forth above, the CPU 56 supplies the signal to the heater control circuit 63 to thereby energize the heater 16 so that the drying cauldron 10 is heated at the bottom portion thereof. Accordingly, the bottom of the drying cauldron 10 is heated by the heater 16 and the temperature of the raw sewage in the drying cauldron 10 reaches the boiling point whereby the liquid component of the raw sewage is vaporized.

During heating of the drying cauldron 10 by the heater 16, the rotary shaft 38 is rotated by the gear box 14 so that the stirring blades 39 are rotated at the bottom portion of the drying cauldron 10. The heat-holding bodies 40 are rotated by the stirring blades 39 at the bottom portion of the drying cauldron 10 so that the raw sewage is stirred. Successively, the raw sewage is mixed together so as to be heated at a uniform temperature and the heat accumulated in the heat-holding bodies 40 is transmitted to the surrounding raw sewage from the surfaces of the heat-holding bodies 40. Since the heat-holding bodies 40 are spherical, the surfaces thereof having large areas, and the speed of drying the raw sewage is expedited so that the liquid component of the raw sewage is gradually evaporated.

The vapor formed by the evaporation of the liquid component in the drying cauldron 10 passes through the discharge pipe 19 and the closing valve 20 and flows into the air introduction pipe 21 and the heating pipe 17. When the vapor flows into the heating pipe 17, it is mixed with the air heated by the heater 47 so that the vapor temperature, which lowers during the flow thereof, is reheated or increased by the hot air from the heater 47 and is supplied to the catalyst box 15. The air passed the filter 49 of the catalyst box 15 contacts the surface of the catalyst 50 and the bad smell component in the air is subjected to oxidation and reduction by the catalyst 50 and is made odorless. Thereafter the air in the catalyst box 15 is drawn out by the ejector 27 and is diffused outside the raw sewage disposal apparatus 5. In such a manner, i.e., in the order of the air routes, the air circles in the raw sewage disposal apparatus 5, the liquid component evaporated in the drying cauldron 10 is subjected to the deodorizing treatment is diffused into the atmosphere.

The cleaning of the drying cauldron 10 and the separation of dust from the air are described hereinafter.

The liquid component of the raw sewage contained in the drying cauldron 10 is evaporated by heating the drying cauldron 10 by the heater and the stirring of the raw sewage by the stirring blades 39 and the heat-holding bodies 40. After the drying operation is completed, the component of the raw sewage such as a fibrous substance, etc. which are not vaporized remain in the drying cauldron 10 as residual substances. When such residual substances are in the drying cauldron 10, the residual substances stick to the inner wall of the drying cauldron 10, which impedes the drying operation of the raw sewage. Accordingly, it is necessary to remove the residual substances or dust remaining in the drying cauldron 10 and clean the drying cauldron 10 upon completion of each drying operation. In the cleaning operation, only the residual substances or the dust should be separated from the air and should be collected to prevent them from being diffused to the atmosphere or from sticking to the catalyst box 15 in the air route. The cleaning of the drying cauldron 10 and the separation of the dust from the air should be continuously and automatically performed when it is judged that all the raw sewage in the drying cauldron has been dried.

When the drying operation has been completed, the raw sewage is not present in the drying cauldron 10. However, the temperature of the drying cauldron 10 at the side surface thereof increases since the heater 16 continues to heat the drying cauldron 10. The change of the temperature of the drying cauldron 10 will be detected by the temperature sensor 41. The temperature sensor 41 issues a signal representing the change of the temperature and supplies the signal to the temperature discriminating circuit 55. The temperature discriminating circuit 55 transmits the result to the CPU 56. The CPU 56 judges that all the liquid component in the drying cauldron 10 is evaporated, upon reception of the result from the temperature discriminating circuit 55, and thereafter starts the cleaning operation.

Firstly, the CPU 56 issues an instruction signal to the heater control circuit 63 so that the heater control circuit 63 deenergize the heater 16 to thereby stop the heating of the drying cauldron 10. Secondly, the CPU issues an instruction signal to the valve control circuit 62 so that the valve control circuit 62 opens the closing valves 22, 28 and 34 and at the same time closes the closing valve 20. The air under pressure supplied from the air blower 30 passes through the air blower pipe 31, the air supply pipe 33 and the closing valve 34 and is jetted toward the inside of the drying cauldron 10. There is formed an air route through which the air circles in the drying cauldron, the discharge pipe 19, the closing valve 22, the cleaning pipe 23, the return pipe 25, the closing valve 28, the air introduction pipe 21 and the heating pipe 17 in this order. When the closing valve 34 is open, the air under pressure is jetted toward the inside of the drying cauldron 10 so that the residual substances and the dust in the drying cauldron 10 are blown up. The blown-up residual substances, the dust and the air pass into the discharge pipe 19, the closing valve 20, the cleaning pipe 23 and enter the inside of the collection bag 48. The air passes through the collection bag 48 but the dust is caught by the surface of the collection bag 48. As a result, the dust is separated from the air. The dust alone is collected by the collection bag 48 while the cleaned air alone passes into the return pipe 25, the closing valve 28, the air introduction pipe 21 and enters the heating pipe 17. Since the air from the air blower 18 circles in the heating pipe 17, the cleaned air which enters the cleaning pipe 17 passes into the catalyst box 15 together with the air from the air blower 18 and they are drawn by the ejector 27 whereby they are diffused to the atmosphere. Since the motor 13 continues to rotate during the interval when the air is jetted because of the opening of the closing valve 34, the rotary shaft 38, the stirring blades 39 and the heat-holding bodies 40 are respectively rotated inside the drying cauldron 10. Accordingly, the heat-holding bodies 40 are rotated at the bottom portion of the drying cauldron 10 so that they smash the residual substances fixed to the bottom and the inner wall of the drying cauldron 10 and remove the smashed residual substances. As described above, the residual substances in the drying cauldron 10 are completely removed by the jetting of the air from the tip end of the air supply pipe 33 and the removing of the residual substances by the rotation of the heat-holding bodies 40.

After the residual substances and the dust in the drying cauldron 10 have been removed by jetting the air under pressure from the tip end of the air supply pipe 33, the temporary toilet 1 will be in standby condition for the next user. At first, after the completion of the cleaning operation for a given time, the CPU 56 supplies instruction signals to the motor control circuit 61 and the valve control circuit 62 so that the motor 13 is stopped and the stirring blades 39 are not rotated. The closing valve 20 is open and at the same time the closing valves 22, 28 and 34 are closed. Accordingly, the air route is changed. That is, the air from the air blower 30 flows into the air blower pipe 31, the air supply pipe 33 and the throttle pipe 35 where the amount of the air is throttled and then enters the drying cauldron 10.

The air in the drying cauldron 10 is transmitted to the heating pipe 17 by way of the discharge pipe 19, the closing valve 20 and the air introduction pipe 21. Since the motor 45 in the air blower 18 is always operated and the heater 47 of the heating pipe 17 is energized, the air from the air blower 18 contacts the heater 47 and is heated thereby so that the hot air is supplied to the inside of the catalyst box 15. In such a manner, the temperature of the catalyst 50 in the catalyst box 15 is always kept to operate the catalyst 50, namely, kept to the temperature necessary for performing the oxidation and reduction. By forming the air route and keeping the catalyst warm as set forth above, the raw sewage disposal apparatus 5 is maintained in standby condition for the next evaporating and drying operations.

The raw sewage disposal apparatus 5 repeats one cycle of standby, drying, evaporating and cleaning operations. With the repetition of these cycles, the vapor formed by the evaporation of the liquid component of the raw sewage can be diffused and the residual substances in the drying cauldron is automatically cleaned. Accordingly, even if the airtight drying cauldron 10 is used for a long period of time, the residual substances and the dust do not remain inside the drying cauldron 10, whereby the raw sewage disposal apparatus 5 can be used for a long period of time. A cyclone dust collector is not used for collecting the residual substances and the dust. Rather, the dust is separated from the air by the collection bag. The structure of the dust collector employed by the invention is simplified and the fine particles of the dust can be caught by the collection bag, which causes no pollution of the atmosphere. Since the collected dust can be disposed of together with the collection bag, the dust can be very hygienically disposed of.

FIGS. 7, 8, 9 and 10 are flow charts showing the operations of the raw sewage disposal apparatus 5 according to the first embodiment.

Figure 11:
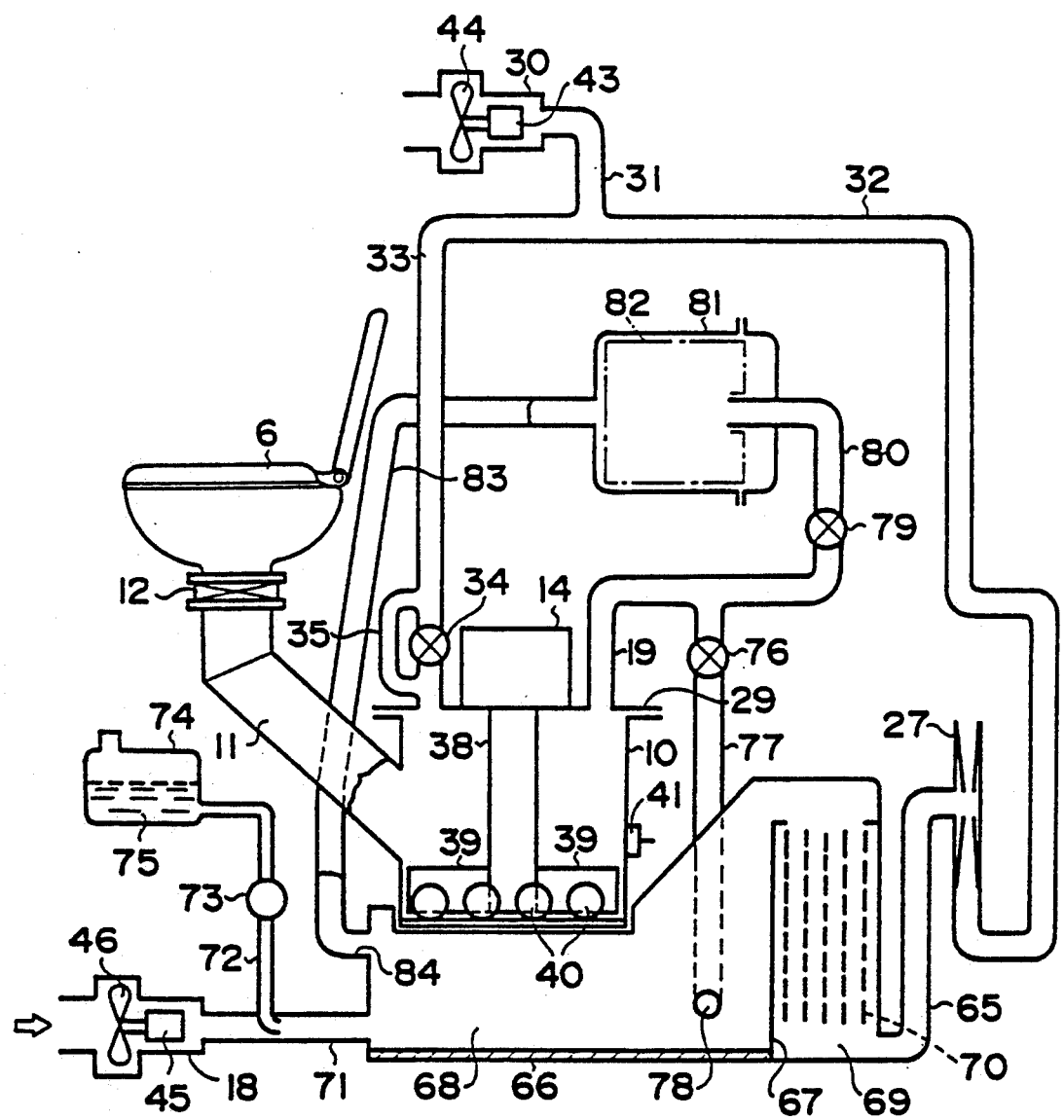
FIG. 11 is a view showing a piping system for connecting the components of a raw sewage disposal apparatus according to a second embodiment.

Second Embodiment (FIG. 11):

A raw sewage disposal apparatus according to a second embodiment will be described with reference to FIG. 11. In the second embodiment, the components which are the same as those in the first embodiment are denoted by the same numerals and the explanation thereof is omitted.

A combustion furnace 66 which is hollow inside thereof is provided under the drying cauldron 10. The upper surface of the combustion furnace 66 is brought into contact with the lower surface of the drying cauldron 10. The combustion furnace 66 rises aslant to form a trapezoid (right side in FIG. 11) at the rear portion thereof and has a partition plate 67 which rises vertically and is fixed to the inside thereof. The inside of the combustion furnace 66 is separated into a combustion chamber 68 and a catalyst chamber 69. The catalyst chamber 69 is filled with a catalyst 70 and communicates with an exhaust pipe 65 at the lower side surface thereof. The tip end of the exhaust pipe 65 is connected to a negative pressure side of the ejector 27.

The discharge pipe 19 is connected to the cover plate 29 so as to communicate with the inside of the drying cauldron 10. The discharge pipe 19 is branched into two in which one branched pipe is connected to an air introduction pipe 77 by way of a closing valve 76 and the other branched pipe is connected to a cleaning pipe 80 by way of a closing valve 79. The tip end of the air introduction pipe 77 is connected to a discharge port 78 which is open at the lower portion of the combustion chamber 68. The tip end of the cleaning pipe 80 extends into the inside of a dust collection box 81. The dust collection box 81 houses therein a collection bag 82 which is formed of a cloth or coarse paper. The tip end of the cleaning pipe 80 is attached to the opening of the collection bag 82. The side surface of the dust collection box 81 communicates with the tip end of a return pipe 83. Another end of the return pipe 83 is connected to a discharge port 84 which is defined at the side surface of the combustion furnace 66 and at one side of the combustion chamber 68 (left side in FIG. 11). A burner pipe 71 is connected to and communicates with the side surface of the combustion chamber 68 (left side in FIG. 11). The air blower 18 is connected to the tip end of the burner pipe 71. The burner pipe 71 generates flame by mixing the air with fuel. A fuel supply pipe 72 is connected to the burner pipe 71 and has a fuel pump 73 midway thereof for supplying a given amount of fuel. The upper end of the fuel supply pipe 72 is connected to an oil tank 74 for storing fuel 75 therein.

The operation of the raw sewage disposal apparatus according to the second embodiment will be described hereinafter.

The closing valves 34 and 79 are closed and the closing valve 76 is open in order to dry the raw sewage contained in the drying cauldron 10 and successively the motors 13, 43 and 45 are driven. The air under pressure is supplied from the air blowers 18 and 30 by the driving of the motors 43 and 45. A small amount of air is supplied from the air blower 30 into the drying cauldron 10 by way of the air supply pipe 33 and the throttle pipe 35. At the same time, since the air is supplied from the air blower 30 to the ejector 27 by way of the pressure application pipe 32, a strong negative pressure is generated in the ejector 27 and draws the air inside the catalyst chamber 69 by way of the discharge pipe 65. The air from the air blower 18 enters the combustion chamber 68 by way of the burner pipe 71 and passes the combustion chamber 68 and thereafter it is transmitted to the catalyst chamber 69. As set forth above, there are formed three air routes, namely, a first air route through which the air circles in the air blower 18, the burner pipe 71, the combustion chamber 68, the catalyst chamber 69, the exhaust pipe 65 and the ejector 27, a second air route through which the air circles in the air blower 30, the air blower pipe 31, the air supply pipe 33, the throttle pipe 35, the drying cauldron 10, the discharge pipe 19, the closing valve 76, the air introduction pipe 77 and the discharge port 78, and a third air route through which the air circles in the air blower 30, the air blower pipe 31, the pressure application pipe 32 and the ejector 27.

In the state where the air circles in the three air routes, the fuel pump 73 is driven so that the fuel 75 is successively jetted from the tip end of the fuel pipe 72 and the jetted fuel is mixed with the air supplied from the air blower 18 in the burner pipe 71, which causes the generation of flame. The mixture of the air and the fuel is completely burned in the combustion chamber 68. Accordingly, heat is generated by the flame and is transmitted to the bottom of the drying cauldron 10, which heats the drying cauldron 10. When the drying cauldron 10 is heated, the raw sewage contained therein is boiled so that the liquid component of the raw sewage is evaporated to thereby form vapor. The thus generated vapor flows together with the air into the discharge pipe 19, the closing valve 76 and the air introduction pipe 77 and is discharged into the combustion chamber 68 by way of the discharge port 78. Accordingly, the vapor formed by the evaporation of the liquid component and the bad smell component are reheated and successively enter the catalyst chamber 69 to thereby contact the catalyst 70. When the evaporated bad smell component contacts the catalyst 70, the bad smell component is subjected to oxidation and reduction by the catalyst 70 and is made odorless and enters the exhaust pipe 65. Since the air in the catalyst chamber 69 is drawn by the negative pressure of the ejector 27, the burned mixture of the air and the fuel generated by the burner pipe 71 together with the vapor in the drying cauldron 10 and the various components are respectively diffused into the atmosphere.

When the raw sewage contained in the drying cauldron 10 is completely evaporated by jetting the fuel from the tip end of the fuel pipe 72 for a given time and burning the mixture of air and fuel in the combustion chamber 68, the change of the temperature of the drying cauldron 10 can be detected by the temperature sensor 41. The cleaning operation starts after the temperature sensor detected the change of temperature. To start the cleaning operation, the closing valves 34 and 79 are open and the closing valve 76 is closed, which causes the air from the air blower 30 to pass the air blower pipe 31, the air supply pipe 33 and the closing valve 34 and thereafter to jet powerfully into the inside of the drying cauldron 10. Accordingly, the residual substances and the dust in the drying cauldron 10 are blown up and pass through the discharge pipe 19, the closing valve 79 and the cleaning pipe 80 and thereafter they are supplied to the collection bag 82 provided in the dust collection box 81. The residual substances and the dust are stuck to the collection bag 82 and are separated from the air so that the cleaned air alone can be moved toward the return pipe 83. The cleaned air flows from the return pipe 83 to the discharge port 84 and is jetted into the combustion chamber 68 from the discharge port 84. The cleaned air successively passes the catalyst chamber 69 and the exhaust pipe 65 and is drawn by the ejector 27 and finally diffused into the atmosphere. After the cleaning operation is performed for a given time, the CPU 56 judges that the inside of the drying cauldron 10 is cleaned and stops the operation of the motor 13 whereby the rotary shaft 38, the stirring blades 39 and the heat-holding bodies 40 are stopped from rotating. At the same time, the amount of the fuel to be supplied from the fuel pump 73 is reduced and the temperature of the combustion chamber 68 is lowered. The closing valves 34 and 79 are closed and the closing valve 76 is open to thereby stand by for the next drying and evaporating operations.

As described in detail above, since the raw sewage disposal apparatus can be applied to the temporary toilet, the operation of the raw sewage disposal apparatus is made hygienic and the handling of the raw sewage disposal apparatus is made very easy. The liquid component of the raw sewage in the airtight vessel is evaporated to prevent the bad smell from being diffused and the residual substances and the dust which remain in the drying cauldron after the completion of the drying operation should be removed. The residual substances and the dust can be separated from the air by the collection bag so that the dust can be caught by the collection bag with assurance. Accordingly, the dust collection mechanism can be simplified because a conventional cyclone dust collector is not employed. Furthermore, since the dust caught by the collection bag can be disposed of together with the collection bag, the disposing operation such as maintenance, etc. can be facilitated.

What is claimed is:

1. A raw sewage disposal apparatus comprising:
a heat-resistant vessel for containing raw sewage therein;

a heating means for heating the vessel to thereby evaporate the liquid component of the raw sewage and dry the raw sewage in the vessel;

a stirring means having a plurality of stirring blades for stirring the raw sewage in the vessel;

a plurality of spherical heat-holding bodies contained in the vessel;

an introduction pipe communicating with a side surface of the vessel;

a stool connected to an upper end of the introduction pipe;

a gear box mounted on the vessel and having a rotary shaft which rotates the stirring means;

a heating pipe which has a heater therein and communicates with a first air supply means at one open end thereof and with a catalyst box at the other open end thereof, said first air supply means comprising an air blower containing a motor and a fan driven by the motor;

a second air supply means communicating with the vessel for supplying fresh air into the vessel;

said catalyst box containing a catalyst therein and communicating with the second air supply means by way of an exhaust pipe and an ejector, said catalyst being heated by the heater in the heating pipe;

an air introduction pipe communicating at one open end thereof with a side surface of the heating pipe, said air introduction pipe being branched into two pipes at an upper open end thereof;

a discharge pipe communicating at one open end thereof with the vessel for exhausting vapor formed by the evaporation of the liquid component of the raw sewage in the vessel, said discharge pipe communicating with one branched pipe of the air introduction pipe by way of a first closing valve;

a cleaning pipe communicating with the other end of the discharge pipe by way of a second closing valve;

a dust collector connected to the cleaning pipe; and a return pipe communicating at one end thereof with the dust collector and communicating with the other branched pipe of the air introduction pipe by way of a third closing valve.

2. A raw sewage disposal apparatus according to claim 1, wherein the second air supply means comprise an air blower containing a motor and a fan driven by the motor, wherein the air blower communicates with one open end of an air blower pipe which is branched into an air supply pipe and a pressure application pipe, the air supply pipe communicating with the vessel by way of a closing valve and the pressure application pipe communicating with the catalyst box by way of the ejector, the ejector generating a negative pressure for drawing vapor and dust from the catalyst box.

3. A raw sewage disposal apparatus according to claim 1, wherein the dust collector houses therein a collection bag for separating dust from air and collecting the dust.

4. A raw sewage disposal apparatus according to claim 3, wherein the collection bag is formed of a cloth.

5. A raw sewage disposal apparatus according to claim 3, wherein the collection bag is formed of a coarse paper.

6. A raw sewage disposal apparatus according to claim 1, further comprising a temperature sensor for detecting a change of temperature of the vessel.

7. A raw sewage disposal apparatus according to claim 1, further comprising a control system for operating the raw sewage disposal apparatus, said control system comprising a temperature discrimination circuit connected to a temperature sensor, a drying instruction circuit connected to an output of an instruction switch which is used for representing the completion of use of the stool, a power supply switch which starts operation of the raw sewage disposal apparatus, a CPU connected to the outputs of the temperature discriminating circuit, the drying instruction circuit and the power supply switch, the CPU including means for issuing instruction signals which are supplied to a shutter control circuit, a motor control circuit, a valve control circuit and a heater control circuit.

8. A raw sewage disposal apparatus according to claim 7, wherein the shutter control circuit, the motor control circuit, the valve control circuit and the heater control circuit are individually and independently operated upon reception of instruction signals from the CPU to thereby control the shutter connected to the output of the shutter control circuit, the first, second and third motors respectively connected to the motor control circuit, the first, second, third and fourth closing valves independently connected to the valve control circuit, and the first and second heaters connected to the heater control circuit.

9. A raw sewage disposal apparatus according to claim 1, further comprising a throttle pipe which is connected to the air supply pipe and passes around the closing valve to form a bypass pipe, said throttle pipe being smaller in diameter than the air supply pipe.

10. A raw sewage disposal apparatus comprising:

a heat-resistance vessel for containing raw sewage therein;

a combustion furnace which is brought into contact with a lower surface of the vessel for heating the vessel to thereby evaporate the liquid component of the raw sewage and dry the raw sewage in the vessel, said combustion furnace being separated into a combustion chamber and a catalyst chamber;

a first air supply means connected to the combustion furnace by way of a burner pipe and a fuel supply pipe; said first air supply means comprises an air blower containing a motor and a fan driven by the motor;

a stirring means having a plurality of stirring blades for stirring the raw sewage in the vessel;

a plurality of spherical heat-holding bodies contained in the vessel;

an introduction pipe communicating with the side surface of the vessel;

a stool connected to an upper end of the introduction pipe;

a gear box mounted on the vessel and having a rotary shaft which rotates the stirring means;

a second air supply means communicating with the vessel for supplying fresh air into the vessel;

the catalyst chamber containing catalyst therein and communicating with the second air supply means by way of an exhaust pipe and an ejector, said catalyst being heated by the heat from the combustion chamber;

a discharge pipe communicating at one open end thereof with the vessel for exhausting vapor formed by the evaporation of the liquid component of the raw sewage in the vessel, said discharge pipe being branched into two pipes;

an air introduction pipe communicating at one open end thereof with the combustion furnace and with one branched pipe of the discharge pipe by way of a first closing valve;

a cleaning pipe communicating with the other branched pipe of the discharge pipe by way of a second closing valve;

a dust collector connected to the cleaning pipe; and a return pipe communicating at one open end thereof with the dust collector and communicating with a discharge port provided at a side surface of the combustion furnace.

11. A raw sewage disposal apparatus according to claim 10 wherein the combustion furnace is hollow and rises aslant to form a trapezoid at a rear portion thereof and has a partition plate which rises vertically and is fixed to the inside thereof for separating the combustion chamber and the catalyst chamber.

12. A raw sewage disposal apparatus according to claim 10, wherein the second air supply means comprises an air blower containing a motor and a fan driven by the motor, wherein the air blower communicates with one open end of an air blower pipe which is branched into an air supply pipe and a pressure application pipe, the air supply pipe communicating with the vessel by way of a closing valve and the pressure application pipe communicating with the catalyst box by way of the ejector, the ejector generating a negative pressure for drawing vapor and dust from the catalyst box.

13. A raw sewage disposal apparatus according to claim 10, wherein the dust collector contains therein a collection bag for separating dust from air and collecting the dust.

14. A raw sewage disposal apparatus according to claim 13, wherein the collection bag is formed of a cloth.

15. A raw sewage disposal apparatus according to claim 13, wherein the collection bag is formed of a coarse paper.

16. A raw sewage disposal apparatus according to claim 10, further comprising a throttle pipe which is connected to the air supply pipe and passes over the closing valve so as to form a bypass pipe, said throttle pipe being smaller in diameter than the air supply pipe.

17. A raw sewage disposal apparatus according to claim 10, further comprising a temperature sensor for detecting a change of temperature of the vessel.

18. A raw sewage disposal apparatus according to claim 10, further comprising a control system of operating the raw sewage disposal apparatus, said control system comprising a temperature discrimination circuit connected to a temperature sensor, a drying instruction circuit connected to an output of an instruction switch which is used for representing the completion of use of the stool, a power supply switch which starts operation of the raw sewage disposal apparatus, a CPU connected to the outputs of the temperature discriminating circuit, the drying instruction circuit and the power supply switch and issuing instruction signals which are supplied to a shutter control circuit, a motor control circuit, a valve control circuit and a heater control circuit.

19. A raw sewage disposal apparatus according to claim 10, wherein the shutter control circuit, the motor control circuit, the valve control circuit and the heater control circuit are individually and independently operated upon reception of the instruction signals from the CPU to thereby control the shutter connected to the output of the shutter control circuit, the first, second and third motors respectively connected to the motor control circuit, the first, second, third and fourth closing valves independently connected to the valve control circuit and the first and second heaters connected to the heater control circuit.

* * * * *